Aug. 6, 1929.  C. F. M. VAN BERKEL  1,723,669
FEED MECHANISM FOR SLICING MACHINES
Filed June 20, 1927
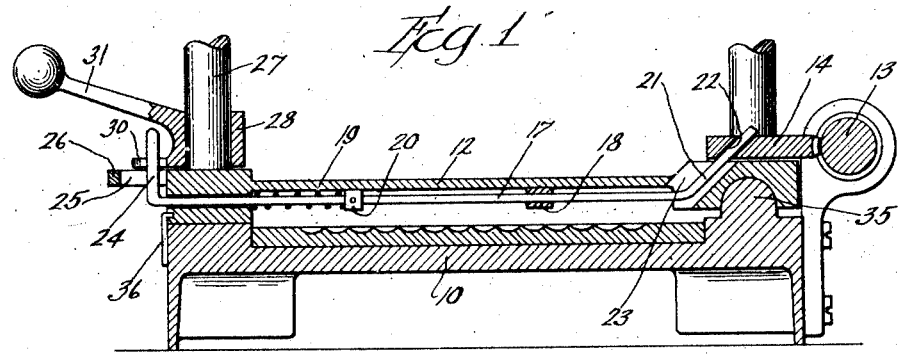
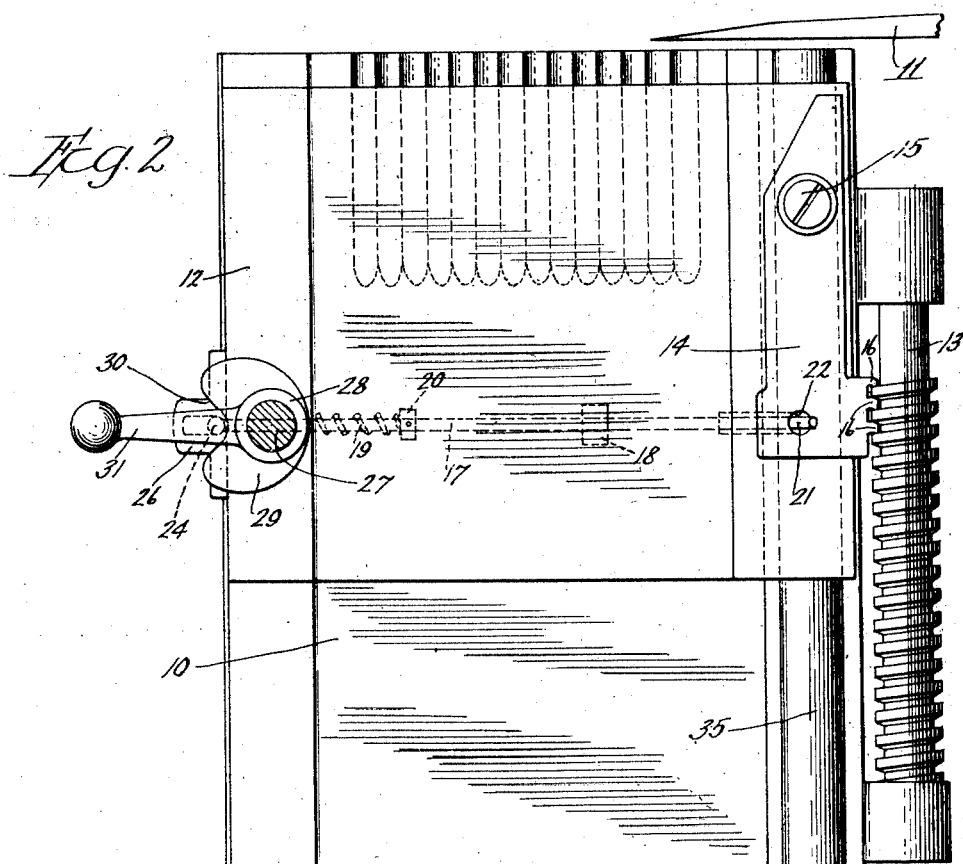
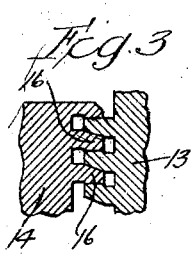
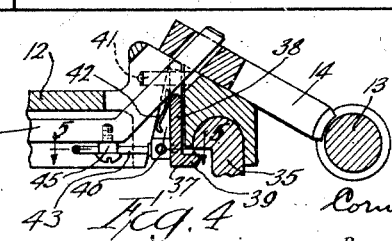
Inventor:
Cornelis F. M. van Berkel
By - Nissen & Crane Attys.

Patented Aug. 6, 1929.

1,723,669

UNITED STATES PATENT OFFICE.

CORNELIS FRANCISCUS MARIA van BERKEL, OF WASSENAAR, NETHERLANDS, ASSIGNOR TO U. S. SLICING MACHINE COMPANY, OF LA PORTE, INDIANA, A CORPORATION OF INDIANA.

FEED MECHANISM FOR SLICING MACHINES.

Application filed June 20, 1927, Serial No. 200,243, and in Germany July 9, 1926.

This invention relates to machines for slicing meat and other material, and has for its object the provision of improved mechanism for feeding the work support toward the slicing knife.

A further object is to provide a feed screw in which backlash and wear will be automatically taken up. Other objects will appear from the following description.

The invention is exemplified in the combination and arrangement of parts shown in the accompanying drawings and described in the following specification and it is more particularly pointed out in the appended claims.

In the drawings,

Fig. 1 is a vertical sectional view thru a work support for slicing machines, showing one embodiment of the present invention;

Fig. 2 is a top plan view of the work support shown in Fig. 1;

Fig. 3 is a fragmentary sectional view of the screw threads employed in the present invention;

Fig. 4 is a fragmentary vertical sectional view showing a modified construction; and Fig. 5 is a section on line 5—5 of Fig. 4.

In slicing machines previously constructed, difficulty has been experienced because of the inequality of the feeding movements resulting from wear of the feed screw and cooperating member engaging the screw. The present invention provides means for automatically taking up the wear on the feed screw by providing threads which are trapezoidal in cross section so that, by moving the parts toward each other, any looseness will be eliminated. The invention also contemplates means for holding the parts closely together so that relative movement will be prevented.

In the drawings, the numeral 10 designates the reciprocating table of a slicing machine which is moved in well-known manner past a slicing knife 11. The table 10 is provided with the usual sliding work support 12 upon which the meat or other material is clamped. A feed screw 13 is journaled at one side of the table 10 and is intermittently rotated by well-known mechanism for feeding the support 12 toward the slicing knife. A member 14 is pivoted at 15 upon the support 12 and is provided with teeth 16 for engaging the threads on the screw 13. It will be seen from Fig. 3 that the teeth 16 and the threads on the screw 13 are trapezoidal in cross section so that when the parts 13 and 14 are pressed together, any looseness in the contact between the teeth and screw threads will automatically be taken up because of the wedging action of the teeth and threads upon one another. The active faces of the threads, that is the faces which bear upon the teeth 16 to feed the support 12 toward the knife, may be normal to the direction of the force so that the feeding force will not tend to separate the parts. The sides of the threads and teeth opposite the normal surfaces are inclined to provide the wedging action for taking up lost motion. The toothed member 14 is operated by a rod 17 slidably mounted in a guide 18 on the under surface of the work support 12. A spring 19 surrounds the rod 17 and bears against a collar 20 fixed to the rod 17. The end of the rod 17 is inclined upwardly at 21 and extends through an opening 22 in the toothed member 14. A slot 23 is provided in the work support 12 through which the inclined end 21 of the rod 17 freely moves. It will be apparent that the force of the spring 19 will hold the inclined end 21 of the rod 17 against the toothed member 14 and lock the teeth 16 tightly in mesh with the threads of the screw 13. The guide 18 is positioned sufficiently far to the left in Fig. 1 that any outward movement of the toothed member 14 would produce an upward bending movement in the right hand end of the rod 17 so that the rod will not be slid backwardly against the force of the spring 19, but will bind in the bearing 18 and lock the member 14 against movement. Any looseness, however, in the meshing teeth of the screw and toothed member will be immediately taken up by movement of the rod 17 to the right under pressure of the spring 19. Thus the engaging teeth are always locked in close engagement and not merely spring held, but a spring actuated device is always active to take up any play or lost motion.

The end of the rod 17 opposite the portion 21 extends upwardly, as shown at 24, and through a guide slot 25 in a bracket 26 secured to the work support 12. The support 12 is provided with an upwardly projecting bar or post 27 having a sleeve 28 journaled thereon. The sleeve 28 carries a flange 29 having a V- shaped cam notch 30 into which the arm 24 extends. A handle 31 is secured to the sleeve 28 for rotating the sleeve and cam plate 29 upon the post 27. The work support 12 rests upon a guide 35 at one side of the table 10 and is held down at the opposite side by a spring plate 36. When it is desired to move the support toward and from the knife 11 independently of the feed screw 13, this may be done by simply grasping the handle 31 and moving it in the desired direction. The first effect of the pressure on the handle 31 will be to rotate the cam plate 29 so as to move the arm 24 to the left, as viewed in the drawing, and thus withdraw the toothed member 14 from engagement with the feed screw 13. When the handle 31 is rotated, until stopped by the arm 24 and cam plate 29, further pressure on the handle will move the work support along the work table 10.

In Figs. 4 and 5, there is shown a modification having a locking plate for holding the work support upon the reciprocating table at the side adjacent the feed screw. In this modification, the guide 35 is provided with a shoulder 37 and a plate 38 provided with a flange 39 which underlies the shoulder 37. The plate 38 is disposed in a groove 40 in the work support 12 and is supported in the groove by pins 41 which extend loosely through eyes projecting upwardly from the plate 38. Springs 42 hold the plate at the outer side of the slot 40 with the flange 39 extending beneath the shoulder 37. A link 43 is secured to the plate 38 and is provided with a slot 44, through which a screw 45 carried by the rod 17 extends. When the rod 17 is moved to the left to release the toothed member 14 from the screw 13, the screw 45 will engage the end of the slot 44 and withdraw the flange 39 from beneath the shoulder 37 so that the support 12 may be lifted from the guide 35.

I claim:

1. In a slicing machine, a work holder, a screw feed for said work holder comprising complementary members having meshing teeth, the teeth of one of said members being tapered in section, and means for locking said teeth in meshed relation.

2. In a slicing machine, a work holder, a screw feed for said work holder comprising complementary members having meshing teeth, the teeth of one of said members being tapered in section, and means for continuously pressing said members together to take up backlash between said teeth and for locking said members against relative separating movement.

3. In a slicing machine, a work holder, complementary screw members comprising a feed screw and toothed block for feeding said work holder, one of said complementary members having the teeth thereof wedge-shaped in section, a spring for urging said toothed block into engagement with said feed screw, and means for locking said block against reverse movement.

4. In a slicing machine, a work holder, a feed screw for said work holder having threads wedge-shaped in section, a toothed block having wedge-shaped teeth for engaging said threads, a spring-pressed rod having an inclined portion engaging said block to move said block toward said screw, and means for preventing reverse movement of said rod under force exerted by said block in said inclined face.

5. In a slicing machine, a work holder, a support for said work holder, a feed screw for moving said work holder on its support, and a toothed member having trapezoidal shaped teeth engaging said feed screw.

6. In a slicing machine, a work holder, a support for said work holder, a feed screw for moving said work holder on its support, said feed screw having threads thereon which are trapezoidal in cross section, and a toothed member having complementary shaped teeth engaging said threads.

7. A slicing machine comprising a work holder, a support for said work holder, a feed screw for moving said work holder on its support, the threads of said feed screw being tapered in section, a toothed member connected with said work holder and having teeth engaging the threads of said feed screw, said teeth being tapered in section to fit the threads of said feed screw, and means for exerting force on said toothed member to hold said teeth and threads closely in mesh with each other.

8. A slicing machine comprising a work holder, a support for said work holder, a feed screw for moving said work holder on said support, the threads of said feed screw having one face of each thread tapered and the other face normal to the axis of said feed screw, a toothed member having teeth thereon engaging the threads of said screw, said teeth being shaped to fit the threads of said screw, a spring for urging said toothed member into mesh with the threads of said feed screw, and means for locking said toothed member in the position to which it is moved by said spring.

9. A slicing machine comprising a work holder, a support on which said holder is mounted, a knife for slicing material held by said work holder, a feed screw for moving said work holder toward said knife, the threads of said screw having square faces on the sides thereof adjacent said knife and having the opposite faces thereof tapered, a toothed member movably mounted on said work holder and having the teeth thereof shaped to fit the openings between the threads on said feed screw, and a spring for holding said toothed member in mesh with said screw.

10. A slicing machine comprising a work holder, a support on which said holder is mounted, a knife for slicing material held by said work holder, a feed screw for moving said work holder toward said knife, the threads of said screw having square faces on the sides thereof adjacent said knife and having the opposite faces thereof tapered, a toothed member movably mounted on said work holder and having the teeth thereof shaped to fit the openings between the threads on said feed screw, a spring for holding said toothed member in mesh with said screw, and means for locking said toothed member against reverse movement.

11. A slicing machine comprising a work holder, a support for said work holder, a feed screw for moving said work holder on said support, complementary wedge-shaped threads and teeth on said feed screw and toothed member respectively, a spring for holding said toothed member and feed screw in mesh with each other, and a handle operable to withdraw said toothed member from said feed screw and to move said work holder upon its support.

12. A slicing machine comprising a work holder, a support on which said work holder is mounted, a feed screw for moving said work holder on said support, a toothed member movably mounted on said work holder for engaging said feed screw, a spring-actuated rod for holding said toothed member in mesh with said feed screw, a handle pivotally mounted on said work holder, and a cam having cam faces thereon for moving said rod to withdraw said toothed member from said feed screw when said handle is actuated for moving said work holder in either direction upon its support.

13. A slicing machine comprising a work holder, a support on which said work holder is mounted, a feed screw for moving said work holder on its support, a spring-held toothed member on said work holder for engaging said feed screw, a retainer for holding said work holder on its support, and a common operating device for withdrawing said toothed member from engagement with said feed screw and for releasing said retainer.

14. A slicing machine comprising a work holder, a support on which said work holder is mounted, a feed screw for moving said work holder on its support, a handle for shifting said work holder on its support, a toothed member movably mounted on said work holder for engaging said feed screw, a retainer for holding said work holder on its support, and means actuated by said handle when operated for moving said toothed member from engagement with said feed screw and for releasing said retainer.

In testimony whereof I have signed my name to this specification on this 18th day of May, A. D. 1927.

CORNELIS FRANCISCUS MARIA van BERKEL.